United States Patent [19]

Thornton

[11] Patent Number: 4,742,899

[45] Date of Patent: May 10, 1988

[54] FIBER REINFORCED TUBULAR COMPONENT

[75] Inventor: Peter H. Thornton, Dearborn, Mich.

[73] Assignee: Ford Motor Company, Dearborn, Mich.

[21] Appl. No.: 733,022

[22] Filed: May 13, 1985

[51] Int. Cl.$^4$ .............................................. F16F 7/12
[52] U.S. Cl. ................................. 188/377; 74/492; 280/777; 293/133; 296/189
[58] Field of Search ........................ 188/377, 371, 376; 280/777; 74/492; 293/133; 138/DIG. 2; 296/189

[56] References Cited

U.S. PATENT DOCUMENTS

| | | | |
|---|---|---|---|
| 2,870,871 | 1/1959 | Stevinson | 188/377 |
| 3,238,690 | 3/1966 | Wilkins | |
| 3,552,525 | 1/1971 | Schudel | 188/377 |
| 3,682,463 | 8/1972 | Radimirsch et al. | 188/377 X |
| 4,058,188 | 11/1977 | Vrillon | 188/377 |
| 4,154,469 | 5/1979 | Goupy et al. | 188/377 X |
| 4,171,626 | 10/1979 | Yates et al. | 138/DIG. 2 X |
| 4,336,868 | 6/1982 | Wilson et al. | 188/376 |
| 4,601,367 | 7/1986 | Bongers | 188/377 |

FOREIGN PATENT DOCUMENTS

| | | |
|---|---|---|
| 1139260 | 11/1962 | Fed. Rep. of Germany . |
| 1609774 | 8/1970 | Fed. Rep. of Germany . |
| 2640937 | 3/1977 | Fed. Rep. of Germany ...... 188/376 |
| 2238341 | 2/1975 | France . |

OTHER PUBLICATIONS

Thornton, P. H., *J. Comp Mat.*, vol. 13, (1979), pp. 247-262.

Thornton, P. H., and Edwards, P. J., *J. Comp. Mat.*, vol. 16 (1982), pp. 521-545.

Farley, G. L., *NASA Technical Memorandum*, 84638, Mar., 1983.

Hull, D., *Energy Absorption of Composite Materials Under Crash Conditions*, 1982 in Science and Engineering of Composites.

Kunstoffe Im Bau, vol. 20, No. 2, May 1985, pp. 60–63, Munchen, De, A Rubben; "Kunstoffe in Neuen Konstruktioner Bauelemente-Schalen".

*Primary Examiner*—George E. A. Halvosa
*Attorney, Agent, or Firm*—Peter D. McDermott; Roger L. May

[57] ABSTRACT

A filament-reinforced plastic composite tube or tubular component is adapted to be load bearing and to more efficiently absorb energy by stable collapse in the event of axially compressive impact. The tubular component has at least one substantially planar wall comprising coplanar laminations of filament-reinforced plastic, wherein at least a portion of the filaments are non-oriented material such as graphite or glass and extend axially substantially parallel to the longitudinal axis of the tube. The tubular component is characterized in that the tube is provided at one end with a collapse trigger means adapted to promote stable, energy absorbing collapse of the tube. Specifically, the tube wall has a bevelled end surface forming at least one apex substantially normal to the plane of the aforesaid coplanar laminations. Each bevelled end surface is at an angle of about 5°–40° to a line coplanar with the laminations and perpendicular to the axially extending filaments thereof.

25 Claims, 2 Drawing Sheets

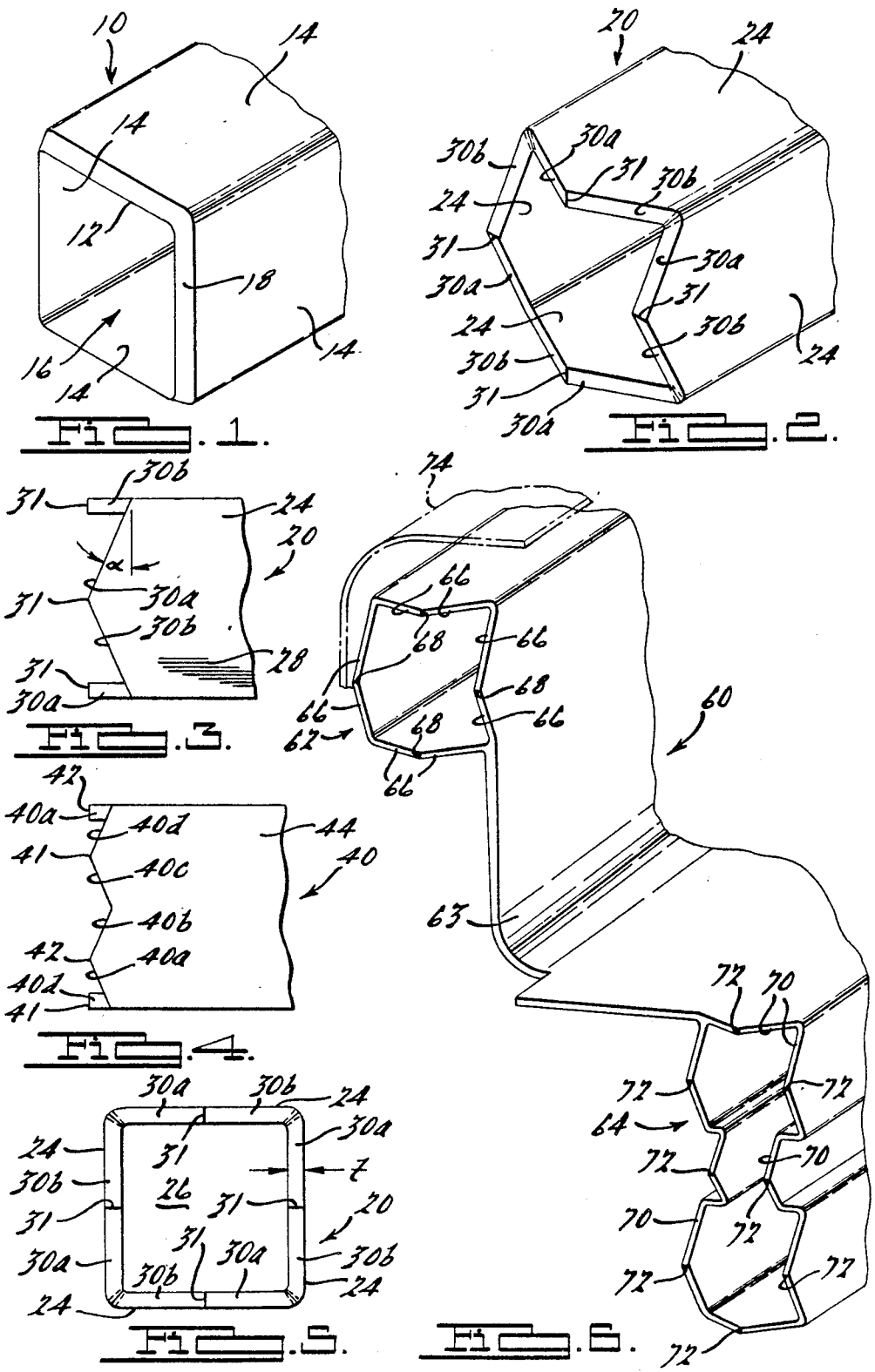

FIBER REINFORCED TUBULAR COMPONENT

BACKGROUND OF THE INVENTION

The present invention relates to fiber reinforced plastic structures suitable for use on load bearing components and having improved energy absorbing characteristics. Specifically, the present invention relates to fiber-reinforced plastic composite tubes suitable for use as structural components and load bearing members. More particularly, it relates to such composite tubes having an improved collapse initiator or collapse trigger means to cause stable collapse of the tube and increased impact energy absorption capability in the event the tube undergoes destructive axial impact.

The high strength, stiffness and low density of fiber-reinforced synthetic material composites recommend such materials for many structural applications in view of their potential for structural weight reduction. Fiber-reinforced plastic materials are characterized by low strain to failure properties ("brittleness"), but it has now been well established that structures made from such materials can have an energy absorption potential as good as or better than those made from metals, even under high loading rates. The major difference between such composites and metal structures in this respect is that metal structures almost invariably collapse by buckling and folding, which involves plastic deformation, whereas fiber-reinforced plastic composite structures almost invariably collapse by fracture processes involving fiber and matrix fracture, fiber/matrix debonding and delamination.

One particularly attractive potential application for fiber-reinforced plastic components is as structural, load bearing motor vehicle body components, such as support beams and the like. In particular, the application of fiber-reinforced plastic composites to the front end structure of a motor vehicle has significant potential, apart from the advantages of weight reduction, due to the possibility of parts integration. Analytical techniques for the design of such composite material load bearing structures are established, as are suitable manufacturing techniques. In many such applications, however, including particularly motor vehicle structural components, the load bearing capacity during structural collapse and the energy-of-impact absorption capacity of the structural component are significant to the question of component design. Studies have been conducted to examine the energy absorbing capability of fiber-reinforced synthetic materials during destructive impact. Thornton, P. H., *J. Comp. Mat.*, Vol. 13, (1979), pp. 247–262; P. H. Thornton and P. J. Edwards, *J. Comp. Mat.*, Vol. 16, (1982), pp. 521–545. Such studies on the axial crushing of fiber-reinforced plastic tubes have indicated that significant energy absorption can be obtained from these materials, under some circumstances exceeding that which can be obtained from metal tubes of similar size. Thus, fiber-reinforced plastic composite structures can provide energy absorption with less weight than comparable metal structures, which is particularly useful in the design and manufacture of motor vehicles in which reduced weight provides improved fuel efficiency.

Energy absorption upon axial crushing of composite tubes is known to be dependent upon the geometry and fiber orientation of the tube and upon the mechanism by which the tube collapses. Tubes which collapse by buckling rather than by crushing, that is, tubes which exhibit "unstable" collapse modes, absorb less energy than those which exhibit "stable" collapse modes. Generally, unstable collapse modes are more likely in rectilinear composite tubes, that is in tubes of rectangular (including square) cross section, than in cylindrical tubes, perhaps because of the presence of strong, rigid corners with weak planar side walls. For tubes having planar walls, the collapse mode is known to be dependent upon tube relative density, that is, the ratio of wall thickness to wall width, fiber orientation, fiber type and temperature. Nevertheless, composite tubes having one or more flat walls are desirable for use as structural load bearing components, espcially for use as motor vehicle components since packaging constraints may not permit an entirely cylindrical cross-section and since other components are more easily secured to flat wall sections.

Attempts have been made to control the collapse mode of composite material rectilinear tubes to improve the energy absorption characteristics thereof. For example, to provide uniform collapse in an axially crushed fiber-reinforced plastic rectilinear tube, attempts have been made to initiate the collapse at one end of the tube. It has been found that to obtain stable crush and high energy absorption, a collapse initiator or collapse trigger means is required to initiate the collapse process. If the trigger means is absent or does not function, then the structural collapse can occur in an unstable mode (e.g., the tube can break into a few large sections) with low energy absorption. Specifically, it is known to provide a collapse trigger by providing one or another configuration to the end of the tube. More specifically, it previously was known to provide a collapse trigger for glass or graphite fiber reinforced plastic rectilinear tubes in the form of a chamfered or bevelled tube end surface, as shown in FIG. 1. The reduced tube end surface which makes contact upon initial impact provides stress concentration necessary to form numerous starting cracks at lower applied loads. Cracks nucleated at the bevel then propagate (on further loading) into the body of the tube causing interlaminar fracture, fiber fracture and fiber/matrix separation. In addition to causing the collapse to propagate in a stable manner, the initiator or trigger means can reduce the initial load at which the collapse commences. In a fiber-reinforced plastic rectilinear tube used as a structural component of a motor vehicle, mounted horizontally in a fore-and-aft direction, for example, the effect of reducing the initial load is to produce a less aggressive impact, that is, to moderate the shock of a tube-collapsing impact.

It is an object of the present invention to provide a fiber-reinforced plastic tube having collapse characteristics significantly improved over those of known fiber-reinforced plastic rectilinear tubes. In particular, it is an object of the invention to provide a structural composite tube having at least one flat wall and adapted to be load-bearing, which tube has improved energy absorption capability upon being axially crushed.

SUMMARY OF THE INVENTION

In the following discussion of composite tubes, reference to an axial direction or dimension will mean the direction or a measurement taken along a line parallel to the longitudinal axis of the tube. Reference to a lateral direction or dimension will mean the direction or a measurement taken along a line in the plane of a flat tube wall, perpendicular to the longitudinal axis of the tube. Thus, the width of a tube wall is the lateral dimension of the tube. The radial dimension of a tube wall is the thickness of the tube wall. The relative density of a tube means the ratio of the volume of the tube to that of a solid bar of the same external dimensions.

According to the present invention, a fiber-reinforced plastic tube is adapted to be load bearing, with at least one substantially flat tube wall comprising axially extending laminations of fiber-reinforced plastic coplanar with the flat tube wall, wherein at least a portion of the reinforcement filaments or fibers of such coplanar laminations are of non-oriented material, such as glass or graphite, and extend axially substantially parallel to the longitudinal axis of the tube. The aforesaid flat tube wall has an average tube wall thickness to wall width ratio of at least about 0.02:1, the width of said flat tube wall being measured in a direction substantially perpendicular to the axially extending fibers thereof. The filament reinforced synthetic material tube of the invention is characterized in that at one end of the tube the aforesaid flat tube wall has a bevelled end surface forming at least one apex substantially normal to the planes of the coplanar laminations. Such bevelled end surface extends at an angle of about 5°–40° to a line coplanar with the laminations and perpendicular to the axially extending fibers of the flat tube wall.

A fiber-reinforced plastic composite structure having a tubular section with at least one planar tube wall provided with the aforesaid trigger means according to the present invention, and especially such composite structures having one or more such tubular sections defining substantially rectangular bores, are found to provide significantly enhanced collapse stability and significantly increased energy absorption capability. That is, as discussed above, if the one or more planar walls are exceedingly thin (relative to width), then it is found to collapse in an unstable mode notwithstanding the trigger means. More specifically, to achieve substantially stable collapse and substantially increased energy absorption capability, the plannar tube walls should have a wall thickness to wall width ratio, as stated above, of at least about 0.02:1, preferably from about 0.02:1 to about 0.3:1.

According to a preferred embodiment of the invention, a structural load bearing component of a motor vehicle body is provided, which component comprises a horizontally mounted fiber-reinforced synthetic material tube as described above. More specifically, such vehicle body component can be adapted to be mounted in a fore-and-aft direction in the front end of a motor vehicle with a forward end of the tubular component facing forward in the vehicle. The one or more tubular portions of the component each comprises four substantially flat or planar walls substantially enclosing a bore of substantially rectangular cross section, each of the walls comprising axially extending coplanar laminations of fiber reinforced plastic and having a wall thickness to wall width ratio of at least about 0.02:1, the width of the walls being measured in a direction substantially perpendicular to the axially extending fibers. The tubular portions of the vehicle component each is characterized in that the aforesaid flat walls thereof each has at its forward end a bevelled end surface forming at least one apex, the one or more apices of such end surface being normal to the plane of the coplanar laminations forming that wall.

Additional and preferred features of the present invention will be apparent from the following detailed description and from the drawings which are part of this disclosure.

BRIEF DESCRIPTION OF THE DRAWINGS

The invention is described below with reference to the drawings, in which:

FIG. 1 is a perspective view showing a fiber-reinforced synthetic material tube according to the prior art;

FIG. 2 is a perspective view of a fiber-reinforced synthetic material tube according to the present invention;

FIG. 3 is a side view of the fiber-reinforced synthetic material tube of FIG. 2;

FIG. 4 is a side view of a fiber-reinforced synthetic material tube according to an alternative embodiment of the present invention;

FIG. 5 is an end view of the fiber-reinforced synthetic material tube of FIG. 2;

FIG. 6 is a perspective view showing a structural load bearing component of a motor vehicle body incorporating filament reinforced synthetic material tubular portions in accordance with the present invention;

DETAILED DESCRIPTION OF PREFERRED EMBODIMENTS

Figure 7:
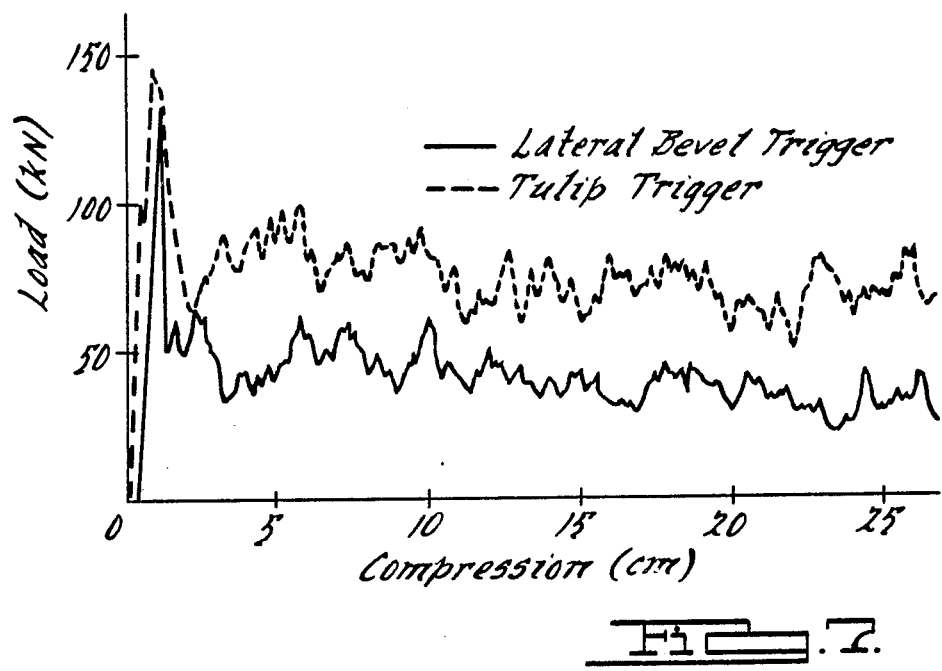
FIG. 7 is a graph showing a comparison of a fiber-reinforced plastic tubular component according to the invention with a fiber-reinforced plastic tubular component according to the prior art, the comparison being the degree of compression (measured in centimeter) as a function of load (measured in kilonewtons)

As noted above, FIG. 1 shows a fiber-reinforced plastic composite tube according to the prior art. Specifically, tube 10 is shown to have a bevel trigger 12 according to the prior art. The tube has flat side walls 14 defining a rectangular bore 16. The end surface 18 of the tube 10 is bevelled to form bevel trigger 12 comprising a laterally extending apex, that is, an apex which for each wall 14 is parallel to the plane of the wall. Such lateral bevel is known to act as a trigger mechanism to provide more stable collapse of the tube upon axial impact of sufficient force to crush the tube.

Referring now to FIGS. 2, 3 and 5, a fiber-reinforced synthetic material tube 20 according to the present invention is shown. Tube 20 is a fiber-reinforced plastic composite tube of rectangular (specifically, square) cross section. The four flat walls 24 are of substantially uniform thickness and define a rectilinear bore 26. Referring to the trigger mechanism of the composite tube of the invention, it can be seen best in FIG. 2 that each of the flat walls of tube 20 has a bevelled end surface. In particular, the end surface of each wall provides bevels 30a, 30b at an angle of about 5°–40° off lateral. That is, each bevelled end surface 30a, 30b is at an angle of about 5°–40°, more preferably about 10°–20°, to a line perpendicular to the axially extending filaments. Such angle α is shown in FIG. 3. As the angle α increases the bevelled end portion of the tube becomes more axially elongated and more easily deflected, rather than crushed, upon impact. As the angle decreases below about 5° the advantageous effect of the trigger means is significantly diminished and the structure begins to approximate that of a flat-ended tube. The bevelled surfaces meet at an apex 31 which is seen to be substantially normal to the surface of the wall. That is, the apex is substantially normal to the coplanar laminations of fiber-reinforced plastic which form the wall of the tube.

It will be understood by the skilled of the art in view of the present disclosure that the bevelled end surface of a composite tube within the scope of the invention need not have a sharply formed apex. That is, the description of the one or more apices as being normal to the coplanar laminations is intended to include an apex which is blunted by rounding and also to include one which is sharpened to a single point rather than a line between the two bevels of the end surface which form the apex. The pointed, linear and rounded apices are readily understood to be essentially the same trigger means in view of the present disclosure, since each presents a forward contact surface which is small in the lateral direction, that is in the direction parallel to the coplanar laminations. This is in contrast to the prior art bevel trigger of FIG. 1, wherein the contact surface is substantially co-extensive with the tube wall in the lateral direction. The equivalency of the aforesaid rounded, linear and pointed trigger means of the invention is best understood in view of the fact that upon initial contact with an axially directed force, a point apex or line apex (as in FIG. 2) or a rounded apex would undergo crushing and would in all cases yield an initially small area of contact which, as aforesaid, would have a small lateral dimension in comparison to the lateral dimension of the wall. That is, during initial loading, flattening of the apex of the bevel occurs due to communication, plastic deformation, etc. Stress concentration at the apex would nucleate cracks, but the force necessary to propagate the cracks in the plane of the laminations would be maximized. Because of the anisotropy of the composite material, cracks would grow in an interlaminar manner. Because the laterally extensive bevel of the trigger means shown in FIG. 1 is parallel to the laminate layers, the plane of the crack also will be parallel to these layers and cracks would propagate in the plane of the laminations leading to unstable collapse of the wall.

As viewed in FIG. 2, a four sided, rectilinear composite material tube provided with a trigger means according to the present invention can be said to have somewhat a "tulip" appearance and, accordingly, in some instances hereinafter reference will be made to the trigger means of the present invention as a "tulip trigger means", both in referring to a rectangular tube in which the end surface of all four flat tube walls are provided with such trigger means and also to any such composite tube having at least one flat wall section provided with such bevelled end surface.

It is a significant feature of a composite tube of the present invention that the one or more flat or planar walls of the tube provided with the tulip trigger means comprise axially extending coplanar laminations of fiber-reinforced plastic. It is an additional significant feature that at least a portion of the filaments or fibers of such coplanar laminations extend axially substantially parallel to the longitudinal axis of the tube. Such axially extending filaments are represented by filaments 28 in FIG. 3. For the composite tube with tulip trigger means according to the present invention to provide enhanced absorption of destructive, axially directed impact energy at least a portion of the aforesaid axially extended filaments must be of the non-oriented type, such as, for example, glass or graphite filaments. Oriented filaments such as Kevlar (trademark, Dupont Inc., Wilmington, Del.; an aramid fiber) also can be used in small amounts with non-oriented filaments. The axially extending filaments preferably comprise greater than about 5% by weight of the entire filamentary content of the composite material forming the coplanar laminations. More preferably, the axially extending filaments comprise about 5–80% by weight thereof. In combination with such axially extending filaments, additional filaments oriented either circumferentially or diagonally (i.e., at 45°), including woven filamentary layers, can be used.

FIG. 4 depicts an alternative embodiment of the invention wherein a tubular structure has flat walls each having tulip trigger means as described above. In this embodiment, the bevelled end surface of each wall forms more than one apex. More specifically, tube 40 has side walls 44, the end surface of each of which provides bevels 40a–d. Bevels 40a and 40b form apex 41 and bevels 40c and 40d form apex 42. Each of the bevel surfaces is at an angle 5°–40° from the lateral. Of course, the construction of tube wall 44 is as described for the walls 24 of tube 20 of FIGS. 2, 3 and 5. Specifically, it comprises coplanar laminations of fiber-reinforced plastic, wherein about 5%–80% of the fibers are axially extending fibers of non-oriented material such as glass or graphite or a mixture thereof.

The fiber-reinforced plastic composite tubes according to the present invention are easily fabricated according to techniques well known to the skilled of the art. Suitable fabrication techniques include pultrusion methods. Also hand lay-up methods may be used, wherein successive layers of resin impregnated filaments are applied and the structure subsequently is cured, optionally under compression and with heat. The tulip trigger configuration of the tube is easily provided either prior to or after curing of the resin matrix. Thus, for example, the bevels can be cut or ground into the end surface of the tube. As noted above, suitable fibers include, for example, graphite and glass, of which glass filaments are often most suitable in view of their lower cost and commercial availability. Generally, however, the intended application of the composite tube and the physical properties dictated thereby will determine the most preferred fiber type, resin type, fiber to resin ratio and manufacturing technique, according to composite material design principles known to those skilled in the art. Suitable resins include numerous commercially available resins known to be useful in the manufacture of structural, composite material components. Exemplary such resins include epoxy resins, polyester resins, vinyl ester resins, and the like. It generally is preferred that the composite tube comprise resin matrix and reinforcing fibers in weight ratio of at least about 90:10, more preferably about 80:20 to about 20:80.

For both glass and graphite fiber systems, composite tubes having both axial and circumferential fibers are found to have a significantly higher specific energy (impact energy absorption capacity) than tubes of the same size and relative density having 45°/45° diagonal fiber orientations. In 0°/90° fiber lay-ups, the relative magnitudes of the initial peak load, at which collapse process is initiated, and the mean load, at which the collapse process progresses, can be changed independently by the proportion and arrangement of the 0° and 90° layers. If the 90° fibers (i.e., circumferential fibers) are omitted, energy absorption will depend primarily upon the stiffness of the axial fibers. In general, 0° directional fibers (i.e., axially extending fibers) will increase the specific energy of glass fiber-reinforced plastic composites, at least where one or more outer layers of 90° fibers are used to bind the 0° directional fibers. For most applications it is preferred that no more than approximately 80% of the fibers be 0° directional fibers.

With respect to resin type, for glass fiber systems, for example, the specific energy tends to increase in the order: phenolic less than polyester less than epoxy resin, but some results have been reported for certain polyester/glass fiber combinations which are higher than for epoxy resin/glass fiber combinations. Quarterly Reports EAC Project, Dept. Metallurgy and Materials Science University of Liverpool, England. This report has found no dependence of specific energy upon resin fracture toughness, but there does appear to be a linear dependence upon the resin tensile strength and modulus.

Referring now to FIG. 6, a preferred embodiment of the invention is shown in which a structural load bearing tubular component of a motor vehicle body comprises fiber-reinforced plastic composite tubular portions having tulip trigger means according to the present invention. Specifically, structural member 60 comprises tubular portion 62 and tubular portion 64, each of which has flat tube wall sections comprising axially extending coplanar laminations of fiber-reinforced plastic as described above in connection with the embodiment of FIG. 2. A web portion 63 integrally connects tubular portions 62 and 64. Tubular portion 62 seen to comprise bevels 66 forming apices 68. Which apices are normal to the coplanar laminations forming the tubular walls. Similarly, tubular portion 64 is seen to be somewhat hourglass shaped with each of the flat wall sections having a bevelled end surface according to the invention. That is, the end surfaces of tubular portion 64 each provides bevels 70 forming apices 72 which are essentially normal to the coplanar laminations forming the respective side walls. In use, component 60 could be mounted horizontally in a fore-and-aft direction in the front end of a motor vehicle. The exterior sheet metal 74 of the vehicle is seen in FIG. 6. In such application, the composite material tubular component has been found to provide a net decrease in vehicle weight in view of the metal components replaced, while providing essential capacity to absorb the energy of frontal impact in the event of a destructive collision.

The invention and its application will be better understood in light of the following examples. It should be understood that these examples are presented by way of illustration and not by way of limitation.

EXAMPLE I

Tube lengths for crush testing were cut from square section pultruded tubes. The test pieces had cross-sectional dimensions of 10 centimeters by 10 centimeters and a length of approximately 40 centimeters. The tube walls were approximately 0.6 centimeter thick, such thickness being substantially uniform for the entire tube. The pultruded tubes comprised four substantially flat tube walls enclosing an axially extending square bore. The tube walls each comprised coplanar laminations of fiber-reinforced plastic in which about 15% of the fiber were axially oriented. The resin employed was polyester and the fibers were glass fibers. Bevel triggers were cut or ground into the end surface at one end of each tube. A first set of such tubes were formed with the bevel apices parallel to the plane of the laminations (i.e., extending laterally as shown in FIG. 1) and a second set of such tubes were formed with the apices normal to the plane of the laminations according to the present invention (as shown in FIG. 2). In each case the tube length was approximately four times the width (i.e., lateral dimension) of the tube. Compression tests were performed between hardened steel platens in an Instron machine at a strain rate of approximately 0.002 per second. FIG. 7 shows the effect of the two different trigger mechanisms on the load/deflection curves for the crushed tubes. It can be seen from FIG. 7 that the mean collapse load for a tube having a tulip trigger means according the invention is nearly twice that of a tube with the lateral bevel trigger means of the prior art. It is significant to note that the nearly two to one difference in mean collapse load is maintained over approximately the entire crush length of approximately 25 centimeters.

EXAMPLE II

Figure 8:
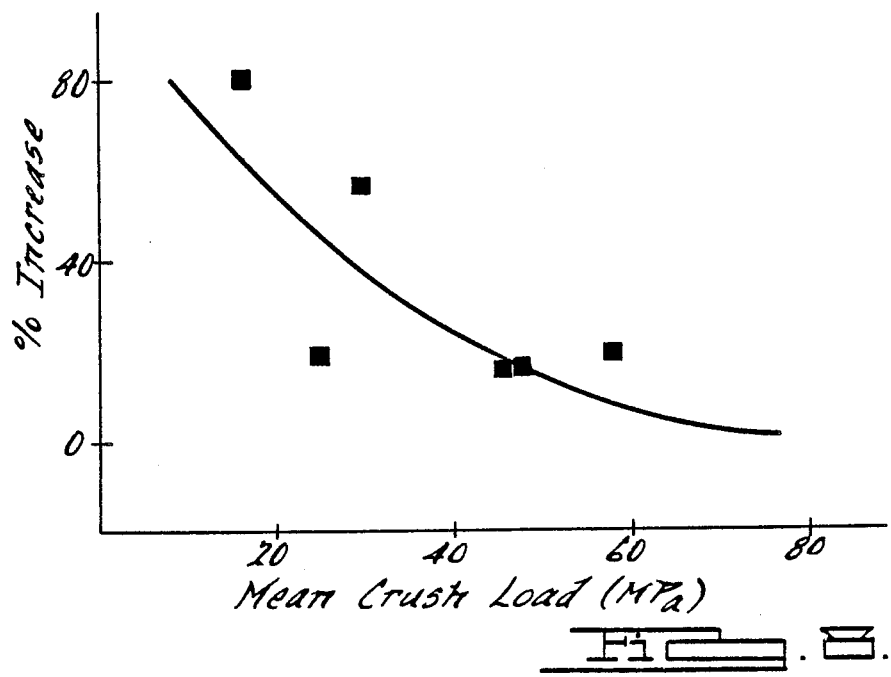
FIG. 8 is a graph showing the percent increase in the mean crush stress of a fiber-reinforced tubular component according to the present invention over that of such component according to the prior art.

This example again compares the tulip trigger means of the present invention and the lateral bevel trigger means of the prior art. A series of square composite tubes were manufactured in accordance with the procedure described in Example I. Each of the tubes had walls of substantially uniform thickness. Tube wall thickness varied from tube to tube from about 0.3 cm to about 0.6 cm. The tubes varied from one another in cross-sectional dimension ranging from approximately 5 cm by 5 cm to approximately 10 cm by 10 cm. Compression tests were performed in accordance with the manner described in Example I and the results are shown in FIG. 8. Specifically, FIG. 8 shows the percent increase in the means crush load for a square section tube provided with a tulip trigger means according to the present invention relative to the mean crush load of the same tube provided with a lateral bevel trigger (as shown in FIG. 1), the values being given as a function of the mean crush load for the lateral bevel trigger. As seen in FIG. 8, the effect of the two different trigger means varied with the section size. For those tubes which are structurally weak, that is, tubes of low relative density (relative density being defined as the ratio of the volume of the tube to that of a solid of the same external dimension) the use of the tulip trigger produces the largest percent increase in the energy absorption during crushing. The tulip trigger means in effect raises the crush stress of the structurally weak sections to values typical of structurally stronger sections. Even in those tubes having a large mean crush load value (those tubes of higher relative density), the use of the tulip trigger means in place of the lateral bevel trigger produces a significant increase in the mean crush load. The average crush load is defined as the area under the load deflection curve divided by the crush distance. Thus, for example, it can be seen that where the mean crush load for a square section fiber-reinforced composite material tube was approximately 58 MPa, the corresponding tube having a tulip trigger means according to the present invention had a mean crush stress approximately 30% greater (i.e., to about 75 MPa). For a square section tube of lower relative density, wherein the lateral bevel trigger means yielded a mean crush load of about 16 MPa, the tulip trigger means of the present invention provided an increase of about 80% in mean crush load (i.e., to about 29 MPa).

It can be seen from the foregoing examples that the fiber-reinforced plastic composite tubes having a flat wall section with tulip trigger means according to the present invention provide two significant advantages over such tubes having a laterally extending bevel trigger according to the prior art. First, the tulip trigger means is found to be a more effective means of inducing stable collapse of the tube, this advantage being particularly significant in connection with tubes of low relative density. Second, in the axial crushing of such tubes the compression necessary before the initial peak load is attained is larger for tubes having the tulip trigger means of the invention than for those having lateral bevel trigger means. This is significant since, as a consequence, tubes having the tulip trigger means provide a softer or more gradual energy absorption upon initial impact. That is, the initial impulse generated in a dynamic loading situation induces less shock in the support structure for tubes having the tulip trigger means.

I claim:

1. A fiber-reinforced plastic tube having at least one substantially planar tube wall comprising axially extending coplanar laminations of fiber-reinforced plastic, wherein at least a portion of the fibers of said coplanar laminations are axially extending fibers of non-oriented material, said planar tube wall having a wall thickness to wall width ratio of at least about 0.02:1, the width of said planar tube wall being measured in a direction substantially perpendicular to said axially extending fibers, said tube being characterized in that one end of said planar tube wall has a bevelled end surface forming at least one apex substantially normal to said coplanar laminations, said bevelled end surface being at an angle of about 5°–40° to a line in the plane of said coplanar laminations and perpendicular to said axially extending fibers thereof.

2. The fiber-reinforced plastic tube of claim 1, wherein each said bevelled end surface is at an angle of about 10°–20° to said line.

3. The fiber-reinforced plastic tube of claim 1, wherein said tube has four substantially flat tube walls enclosing a bore of rectangular cross section.

4. The fiber-reinforced plastic tube of claim 1, wherein said planar tube wall is of substantially uniform wall thickness.

5. The fiber-reinforced plastic tube of claim 1, wherein said planar tube wall has a tube wall thickness to wall width ratio of from about 0.02:1 to about 0.3:1.

6. The fiber-reinforced plastic tube of claim 1, wherein said bevelled end surface forms a single said apex laterally centered on said bevelled end surface.

7. The fiber-reinforced plastic tube of claim 1, wherein said bevelled end surface forms a plurality of apices laterally spaced on said bevelled end surface.

8. The fiber-reinforced plastic tube of claim 1, wherein said tube comprises resin matrix and reinforcing filaments in weight ratio of at least about 90:10.

9. The fiber-reinforced plastic tube of claim 1, wherein said axially extending fibers are at least about 5% by weight of the fibers of said tube.

10. The fiber-reinforced plastic tube of claim 1, wherein said fiber-reinforced plastic comprises fibers selected from the group consisting of graphite filaments, glass filaments and any combination thereof.

11. The fiber-reinforced plastic tube of claim 1, wherein said fiber-reinforced plastic comprises a resin matrix selected from the group consisting of epoxy resin, phenolic resin, polyester resin, and vinyl ester resin.

12. A fiber-reinforced plastic tube having four substantially flat tube walls enclosing a bore of substantially rectangular cross section, said walls comprising axially extending coplanar laminations of fiber-reinforced plastic, wherein at least a portion of the fibers of said coplanar laminations are axially extending fibers of non-oriented material, said walls each having an average wall thickness to wall width ratio of at least about 0.02:1, the width of said walls being measured in a direction substantially perpendicular to said axially extending filaments, said tube being characterized in that at one end of said tube said walls each has an end surface forming two substantially symmetrical bevels forming a single apex, said apex being substantially normal to the plane of said laminations of the respective one of said walls, each bevel of each said wall being at an angle of about 5°–40° from a line coplanar with the laminations and perpendicular to the axially extending fibers of said wall.

13. The fiber-reinforced plastic tube of claim 12, wherein each said bevelled end surface is at an angle of about 10°–20° to said line.

14. The fiber-reinforced plastic tube of claim 12, wherein each said wall is of substantially uniform wall thickness.

15. The fiber-reinforced plastic tube of claim 12, wherein each said wall has an average wall thickness to wall width ratio of from about 0.02:1 to about 0.3:1.

16. The fiber-reinforced plastic tube of claim 12, wherein said tube comprises resin matrix and reinforcing filaments in weight ratio of about 90:10 to about 20:80.

17. The fiber-reinforced plastic tube of claim 12, wherein said axially extending fibers are at least about 5% by weight of the fibers of said tube.

18. A structural load bearing, substantially rectilinear tubular component of a motor vehicle body, being horizontally mounted in a fore-and-aft direction in the front end of said vehicle, with a forward end of said tubular component facing forward in said vehicle, said tubular component comprising axially extending planar walls enclosing a substantially rectangular bore, said planar walls each comprising axially extending coplanar laminations of fiber-reinforced plastic, wherein at least a portion of the fibers of said coplanar laminations are axially extending fibers of non-oriented material, each said planar wall having a wall thickness to wall width ratio of at least about 0.02:1, the width of said planar walls being measured in a direction substantially perpendicular to said axially extending fibers, said tubular component being characterized in that each of at least some of said planar walls has at the forward end thereof a bevelled end surface forming at least one apex substantially normal to said coplanar laminations thereof, each said bevelled end surface being at an angle of about 5°–40° to a line in the plane of said coplanar laminations and perpendicular to said axially extending fibers thereof.

19. The structural load bearing tubular component of claim 18, wherein each said bevelled end surface is at an angle of about 10°–20° to said line.

20. The structural load bearing tubular component of claim 18, wherein said walls each is of substantially uniform wall thickness.

21. The structural load bearing tubular component of claim 18, wherein said walls each has an average wall thickness to wall width ratio of from about 0.02:1 to about 0.3:1.

22. The structural load bearing tubular component of claim 18, wherein the bevelled end surface of each of said walls forms a single apex laterally centered thereon.

23. The structural load bearing tubular component of claim 18, wherein the bevelled end surface of each of said walls forms a plurality of apices laterally spaced thereon.

24. The structural load bearing tubular component of claim 18, wherein said coplanar laminations each comprises resin matrix and reinforcing filaments in weight ratio of from about 90:10 to about 20:80.

25. The structural load bearing tubular component of claim 18, wherein said axially extending fibers are at least about 5% by weight of the fibers of said tube.

* * * * *